(12) United States Patent
Tagliavini et al.

(10) Patent No.: US 7,694,497 B2
(45) Date of Patent: Apr. 13, 2010

(54) MACHINE AND PROCESS FOR FILLING CAPSULES OR SIMILAR

(75) Inventors: Antonio Tagliavini, Bologna (IT); Mauro Minghetti, Bologna (IT)

(73) Assignee: MG 2-S.r.l., Pianoro- Pian di Macina (IT)

( * ) Notice: Subject to any disclaimer, the term of this patent is extended or adjusted under 35 U.S.C. 154(b) by 5 days.

(21) Appl. No.: 11/663,562

(22) PCT Filed: Sep. 26, 2005

(86) PCT No.: PCT/IB2005/002842

§ 371 (c)(1),
(2), (4) Date: Oct. 15, 2007

(87) PCT Pub. No.: WO2006/035285

PCT Pub. Date: Apr. 6, 2006

(65) Prior Publication Data

US 2008/0127609 A1  Jun. 5, 2008

(30) Foreign Application Priority Data

Sep. 27, 2004  (IT)  ............................ BO2004A0599

(51) Int. Cl.
*B65B 1/32* (2006.01)

(52) U.S. Cl. ............................ 53/499; 53/452; 53/454; 53/467; 53/485; 53/52; 53/55; 53/54; 53/502; 53/900

(58) Field of Classification Search ........... 53/452–454, 53/467–468, 471, 473, 485, 52, 54, 55, 499, 53/502, 900
See application file for complete search history.

(56) References Cited

U.S. PATENT DOCUMENTS

| | | | | |
|---|---|---|---|---|
| 4,691,496 A | * | 9/1987 | Anderson et al. | 53/53 |
| 4,964,262 A | * | 10/1990 | Moser et al. | 53/506 |
| 5,135,113 A | | 8/1992 | Mayer et al. | |
| 5,515,740 A | | 5/1996 | Gamberini et al. | |
| 5,602,485 A | | 2/1997 | Mayer et al. | |
| 5,626,171 A | * | 5/1997 | Mirri | 141/152 |
| 6,327,835 B1 | * | 12/2001 | Trebbi | 53/53 |
| 6,684,609 B1 | * | 2/2004 | Bassissi et al. | 53/503 |
| 6,837,280 B2 | * | 1/2005 | Ragazzini et al. | 141/83 |
| 7,032,631 B2 | * | 4/2006 | Py | 141/82 |
| 7,118,010 B2 | * | 10/2006 | Crowder et al. | 222/1 |
| 2004/0050860 A1 | * | 3/2004 | Crowder et al. | 222/1 |
| 2004/0172925 A1 | | 9/2004 | Ragazzini et al. | |

FOREIGN PATENT DOCUMENTS

EP  0 878 182  11/1998
WO  WO 96/20390  7/1996

* cited by examiner

*Primary Examiner*—Christopher Harmon
(74) *Attorney, Agent, or Firm*—Gottlieb, Rackman & Reisman PC

(57) ABSTRACT

A machine (1000) for filling capsules (CS) or similar. The machine (1000) has a number of seat assemblies (10), each of which incorporates a capacitive transducer (14) and possibly other devices, such as an energy storage device (17) and a microprocessor (15), in addition to devices for external connection for power supply and/or communication.

7 Claims, 2 Drawing Sheets

MACHINE AND PROCESS FOR FILLING CAPSULES OR SIMILAR

TECHNICAL FIELD

The present invention relates to a machine for filling capsules or similar (e.g. sachets), in particular pharmaceutical capsules.

BACKGROUND ART

In the pharmaceutical industry, machines are known for filling the bottom shells of capsules with precise doses of at least one pharmaceutical product, and closing the bottom shells with corresponding top shells to obtain respective full capsules as the end product.

Controlling the correct product dosage is traditionally done by weighing the outgoing capsules on electromechanical scales. This system has two main drawbacks. Firstly, the accuracy with which the content of the capsule is weighed is intrinsically limited by weighing the full capsule, and assuming as the tare value the nominal value declared by the maker or a mean batch value, as opposed to the actual weight of each individual empty capsule. Secondly, given the speed limitations of electromechanical scales, only sample control can be done using one scale. For 100% production control, a battery of parallel scales, between which to divide the outgoing capsules, is required.

Considerable improvements to the above method have been made in certain machines of this type manufactured by the Applicant, and wherein weighing is performed at two separate stations, both operating capacitively.

Since, as stated, what is important in machines of this type is the weight of the content of the capsule, the first station weighs the empty capsule (tare), and the second station the full capsule; and, on the basis of the information from the first station, the net weight of the content is determined using appropriate algorithms.

This method, now improved by years of experience, provides for high speed, and therefore 100% production control, and accurate weighing of the actual content. Any capsules containing a product quantity outside the given tolerance range are rejected by an automatic reject system.

At present, these technical improvements are only satisfactory provided sufficient care is taken as regards manufacture of the equipment and performance and processing of the measurements. For example, since the measurements are made on a fast-rotating conveyor wheel, on which the capsules are retained inside cavities, adequate measuring precision calls for ensuring, in particular, precise mechanical tolerances, steady movement of the conveyor wheel, and precise positioning of the capsule inside the respective cavity.

Moreover, this method only provides for controlling the total weight of the product inside capsules or similar. In the case of multicomponent products (products containing a number of components metered successively into the capsule), distinguishing the weights of the individual components involves mechanical complications and providing an additional weighing station downstream from each metering operation.

The present invention therefore provides for improving at least one component forming part of the above capsule filling machines.

On currently used machines, the capsules, as they are being filled, are conveyed by means of a number of bored cylindrical members (seat assemblies), each only housing the bottom shell of a capsule.

The component in question is a "seat assembly" defined herein as "an appropriately shaped, hollow cylindrical member for housing a respective bottom shell".

When housed inside the seat assembly, the bottom shell is filled with at least one product, which may be in the form of powder, granules, tablets, microtablets, liquid, or gel.

In other words, a respective bottom shell of a capsule is first deposited inside each seat assembly conveyed on the machine, and is then filled in one or a number of successive steps with the desired products; and the full bottom shell is then closed with a top shell to form a corresponding capsule.

It should be pointed out that, in the method currently adopted by the Applicant, a whole empty capsule is first weighed (tare), and is then opened, filled, closed, and weighed again (gross).

DISCLOSURE OF INVENTION

In the solution according to the present invention, on the other hand, the tare is represented solely by the bottom shell, which is therefore first weighed empty (tare), then weighed when filled (gross) before being finally closed. In the case of a multicomponent product, the metered product is weighed after each metering operation, and the weight data of each individual component is obtained by appropriately processing the measured differences in capacitance.

The object of the present invention is basically to provide a machine for filling capsules or similar, in particular pharmaceutical capsules, wherein the conventional seat assemblies of the prior art are replaced by a number of improved seat assemblies, each incorporating at least a corresponding capacitive member.

Depending on industrial and/or economic choices, each seat assembly may also incorporate mechanical and/or electronic members for capacitively weighing the content as described below.

By capacitively weighing the bottom shell, first when empty (tare), and then when filled (at each filling step, in the case of a number of metering operations), it is possible, by means of appropriate processing by an electronic processor, to accurately work out the net weight, and determine whether or not it falls within the set tolerance range.

According to the present invention, therefore, there is provided a machine for filling capsules or similar, as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

In addition to the usual component parts of machines of this type—amply described in literature—the machine according to the present invention comprises a number of seat assemblies; and a number of electronic devices for communicating with and powering the seat assemblies by means of appropriate coupling members. The electronic devices, which may or may not be incorporated in the seat assemblies, provide for controlling the system, and for dialoging with the seat assemblies and other parts of the machine, in particular the electronic central control unit governing overall operation of the machine.

Figure 1:
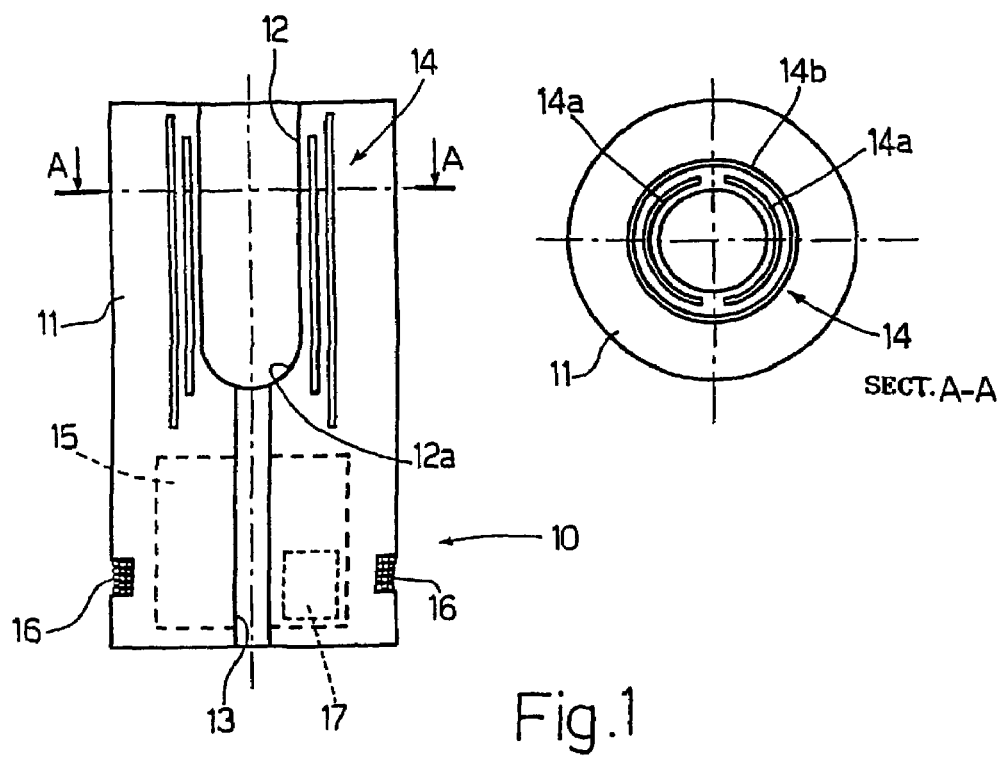
FIG. 1 shows a first embodiment of a seat assembly employed in a machine for filling capsules or similar in accordance with the present invention.

FIG. 1 shows a first embodiment of a seat assembly 10 in accordance with the present invention.

Seat assembly 10 comprises a main body 11 in which is formed a seat 12 shaped to house a respective bottom shell (not shown in FIG. 1) of a capsule (not shown in FIG. 1).

A channel 13 comes out inside a bottom portion 12a of seat 12, for the passage of a push rod (or a jet of compressed air) to expel the full capsule (not shown in FIG. 1) from seat 12.

A capacitive transducer 14 is embedded in main body 11, and comprises two or more active metal plates 14a, and a shield plate 14b external to active metal plates 14a.

Capacitive transducer 14 is connected electrically to an electronic device 15—preferably, though not necessarily, low-power-microprocessor-based—which, as explained in detail below, provides for conditioning the signal of capacitive transducer 14, for communicating externally with the other electronic devices (not shown in FIG. 1) on the machine, and for powering the component parts of seat assembly 10.

In the FIG. 1 embodiment, for example, the communication and power supply functions are performed by means of radio signals and an antenna 16 for wireless connection to other appropriately designed antennas (not shown in FIG. 1) housed on the machine and connected electronically to the fixed electronic devices (not shown in FIG. 1).

This technique is similar to that used in so-called "transponder" devices commonly used in identification (RFID) systems.

Seat assembly 10 also comprises an energy storage member 17 for storing the external power supply, and in the form, for example, of a high-capacitance capacitor (a few tenths of a farad) or a known battery.

Using energy storage member 17, power supply, command reception, measuring, and data transmission can be performed asynchronously, as opposed to synchronously as in most transponders.

Figure 2:
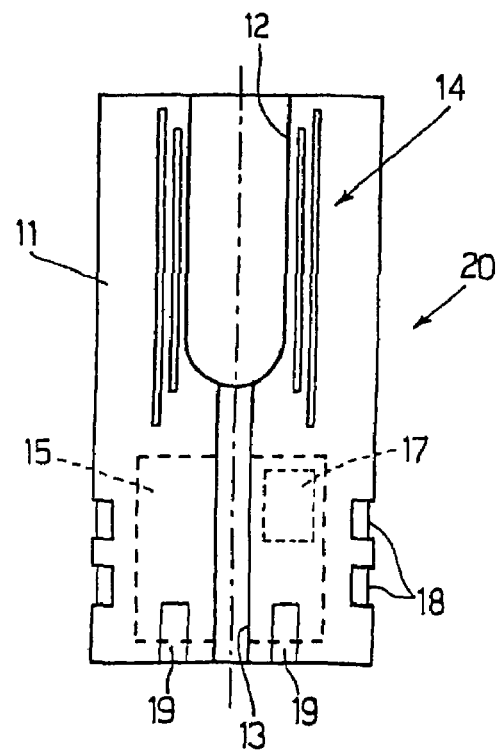
FIG. 2 shows a second embodiment of a seat assembly employed in a machine for filling capsules or similar in accordance with the present invention.

FIG. 2 shows a second embodiment, in which any parts in common with the first embodiment are indicated using the same reference numbers. For the sake of simplicity, therefore, for any parts common to both embodiments, the reader is referred to the description of FIG. 1.

In the second embodiment in FIG. 2, storage member 17 is charged by means of contacts 18, e.g. in the form of rings which come into programmed temporary contact with shoes (not shown) located at appropriate points on the machine; and data transmission between seat assembly 10 and the outside is performed optically by means of an appropriate optoelectronic device 19.

Seat assembly 10 being movable, energy storage member 17 is extremely important, by allowing the required measurement to be made as seat assembly 10 travels from one station (not shown) to another.

This undoubtedly has advantages as compared with the known state of the art, in which measuring is performed within a very short space of time, i.e. as the bottom shell travels past the plate of a fixed transducer. A longer measuring time may be used to make multiple measurements, to reduce the effects of noise and any other interference, and so obtain a more accurate final measurement.

In addition to powering and data transmission with the moving seat assemblies 10, the fixed electronic devices also provide for overall control of the system, for processing the incoming electronic measurements, and for interfacing with the machine to directly control rejection of any capsules outside the tolerance range, and possibly also to supply measuring data externally for further processing (e.g. reject statistics, data filing, etc.).

As will be obvious to anyone skilled in the art, some of the devices in the first embodiment in FIG. 1 may be replaced by other devices in the second embodiment in FIG. 2. In particular, the optical signals in the second embodiment may be substituted for the radio signals in the first embodiment in FIG. 1; and, in the FIG. 2 embodiment, communication and charging may be performed simultaneously using the same contact rings.

The system operates in the steps described below, which may be superimposed partly or completely in terms of both time and function, in the sense that certain members may perform multiple functions. For example, the seat assembly may be powered and data transmitted using the same physical channel.

Briefly, the functions are as follows:

power supply and possible storage;

message reception (e.g. of a conversion start command);

measurement; and message transmission (e.g. of a measurement value) from the seat assembly to the fixed electronic devices.

More specifically, with reference to the FIG. 1 embodiment, the above functions are as follows:

(A) an appropriate receiving antenna (e.g. a coil comprising at least one turn wound externally about the seat assembly) is connected electromagnetically to a fixed antenna appropriately located on the machine along the path of the seat assemblies, and is supplied by the fixed antenna with a given amount of radiofrequency energy which, when rectified, powers the electronic devices on the seat assembly; the presence of an energy storage member (e.g. a high-capacitance capacitor) allows the electronic devices on the seat assembly to operate even over sections in which no power is supplied;

(B) the seat assembly may receive messages, e.g. a conversion start command, over a radiofrequency receiving channel, which may be the same one used for power supply (see point (A));

(C) by controlling the transducer on the seat assembly by means of appropriate signals, the electronics on the seat assembly are able to perform one or more capacitance measurements indicating the weight of the content material;

(D) over the transmission channel (which may also be shared with or separate from the power system), the device may answer the incoming messages, in particular by supplying the fixed on-machine electronic devices with the results of the measurements performed; and from these measurements, the on-machine electronic devices may, using appropriate methods, calculate the variation in weight of the instantaneous content of the seat assembly to work out, as stated, the quantity of pharmaceutical product inside the bottom shell.

Alternatively, function (A) may be performed by a contact system, and functions (B) and (C) may be performed by appropriate optoelectronic means or the same contact system.

To simplify recognition of the seat assemblies, each may be assigned an address which is memorized permanently at the initial programming stage in the fixed on-machine electronic device.

The presence of a two-way channel communicating with the seat assembly permits further functions, such as "calibration" (by which is meant permanent storage of seat assembly parameters in the processor or ground system), or software updating and modifications of the seat assembly processor, if this is designed for so-called IAP (In Application Programming).

Figure 3:
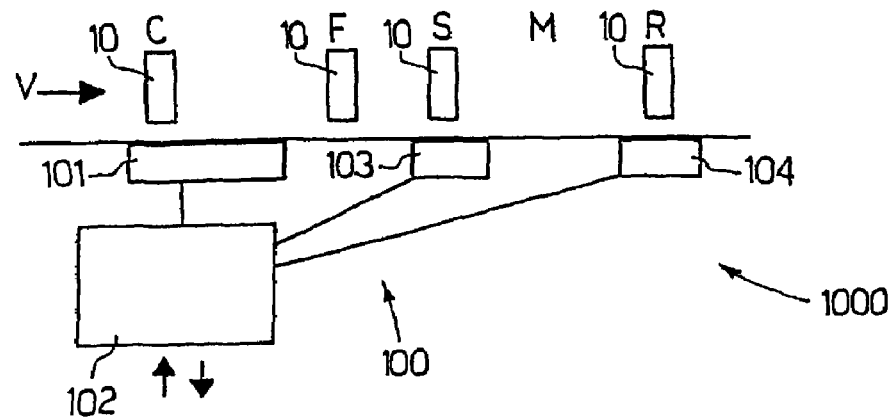
FIG. 3 shows a first example of application of a seat assembly as shown in FIG. 1 or 2.

FIG. 3 shows a first example of an interaction process between a seat assembly 10 and a number of fixed on-machine electronic devices.

Interaction as a whole can be divided into four steps which, for the sake of clarity, are described as though performed separately, though at least some may obviously be performed simultaneously.

At the first step C (C=Charge), a seat assembly 10, conveyed by the system in the direction of arrow V, travels past a fixed on-machine electronic device 100; more specifically, seat assembly 10 travels past a coupling member 101 (e.g. an elongated coil appropriately oriented if power is supplied by radiofrequency or induction), or, in the second embodiment in FIG. 2, contacts 18 slide along member 101 to charge energy storage member 17 (see also FIGS. 1 and 2).

At the second step F (F=Fill), seat assembly 10 is filled (e.g. the empty bottom shell is inserted, or a given measure of drug is deposited inside the bottom shell).

At the third step S (S=Start), seat assembly 10 receives the measurement start command from a central control unit 102 (also forming part of fixed electronic device 100) via an interface member 103 (also forming part of device 100); and the measurement is made over travel distance M.

At the fourth step R (R=Read), seat assembly 10 is interrogated and transmits the value of the measurement made over travel distance M to central control unit 102 via an interface member 104.

Steps (F), (S), (R) and, if necessary, charge step (C) may normally be repeated several times on the machine, by equipping the machine, at appropriate locations, with members 101, 103, 104 for communicating with seat assemblies 10 on one side and with central control unit 102 on the other.

For example, S and R stations may follow each filling step to determine, by subtraction, the weight of the product at each step.

Figure 4:
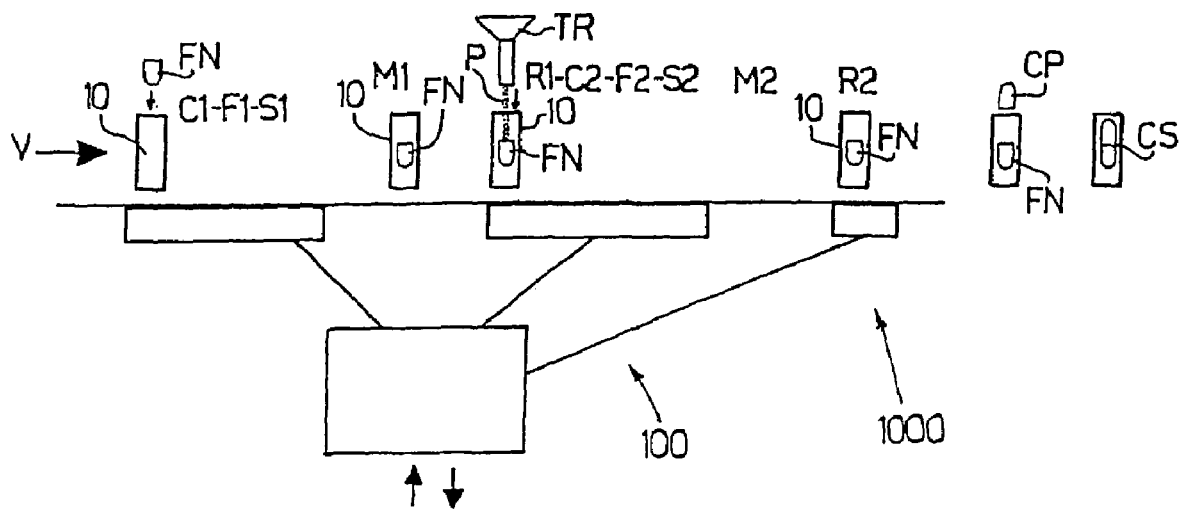
FIG. 4 shows a second example of application of a seat assembly as shown in FIG. 1 or 2.

In fact, if the capsule is filled with only one product, the sequence will be performed twice: a first time on the empty bottom shell, and a second time on the bottom shell containing the product, as shown in FIG. 4.

FIG. 4 shows a second example of an interaction process between a seat assembly 10 and a number of fixed on-machine electronic devices.

More specifically, in FIG. 4, C1 indicates the step of charging a seat assembly 10; F1 indicates the step of inserting a bottom shell FN inside seat assembly 10; S1 indicates the measurement start command step; and M1 indicates the step of weighing bottom shell FN. At read step R1, the system reads the weight value of bottom shell FN, and transmits it to device 100. C2 indicates a further step of charging seat assembly 10; and F2, S2, M2 and R2 indicate the same steps as above, but relative to filling bottom shell FN with a product P from a hopper TR, for example. Device 100 then works out the weight of the product P in bottom shell FN by calculating the difference between the values acquired at R2 and R1.

As will be obvious to anyone skilled in the art, a third measurement may be made of a complete capsule CS comprising bottom shell FN, product P, and a top shell CP (FIG. 4).

As stated, all or some of the steps described above may be superimposed. More specifically, charge and measurement start command steps C and S may be performed at one station, and read step R may be combined with steps C and S relative to the next fill step, thus simplifying the on-machine members, as shown in FIG. 4, in which F1 and F2 indicate two successive fill steps, and M1 and M2 the relative measuring steps.

Fixed electronic device 100, seat assemblies 10, the devices (not shown) for conveying seat assemblies 10, devices TR for filling bottom shells FN with products P, the devices for applying top shells CP to bottom shells FN, and the devices for rejecting capsules CS, form part of a machine 1000 for filling capsules or similar in accordance with the invention (FIGS. 3 and 4).

More specifically, central control unit 102 controls in known manner all the operations performed by the devices forming part of machine 1000, even those not shown in the accompanying drawings.

As opposed to the solutions shown in FIGS. 1-4, simpler solutions (not shown) may conveniently be employed, wherein the seat assembly simply incorporates a capacitive transducer for weighing the material as it is loaded. In which case, the seat assembly comprises few, if any, electronics, and therefore cooperates with electronics on the machine (see below).

This variation is therefore based on a seat assembly equipped solely with a capacitive transducer comprising plates appropriately located inside the seat assembly (in the form of metal plates or coatings) and configured and sized to the characteristics of the object being measured. The plates will normally be located on cylindrical surfaces coaxial with the seat assembly.

The plates will be connected to a series of external electrodes, e.g. in the form of rings coaxial with the seat assembly, for establishing electrical contact with appropriate members (brushes) located at on-machine measuring points; and the contact members will be connected to conditioning electronics on the machine as opposed to the seat assembly.

Given the characteristics of the machine, the following are two purely non-limiting solutions by which to establish contact between the seat assembly and on-machine electronics to perform the measurement.

Application of these solutions is simplified by each exploiting one of the ways in which capsules are currently conveyed in different parts of machines of this type, i.e. inside translating seat assemblies, or on conveyor wheels, on which the capsules are retained by a pneumatic suction system.

In a first solution, measuring is performed as the seat assembly travels through a fixed station equipped with brushes or elastic contacts appropriately shaped to contact the rings on the seat assembly briefly, but long enough to perform the measurement.

In a second solution, the seat assembly is conveyed a given distance on a wheel, on the periphery of which are formed grooved seats, each retaining a respective seat assembly by means of a standard system.

Since the seat assembly is stationary with respect to the conveying member, the rings may therefore be contacted statically by means of a number of spring contacts, e.g. similar to those used in electronic circuit test devices known as "beds of nails". In which case, the conditioning electronics—or part of it—must be set up on the conveyor wheel and connected to the ground section by known means, such as sliding contacts, rotary transformers and/or radio systems, such as increasingly commonly used wireless connections to IEEE standards 802.11 and 802.15.

For connection to the transducer inside the seat assembly, a further embodiment (not shown) employs an inductive system comprising windings appropriately embedded in the body of the seat assembly in lieu of the contact rings. With this system, mechanical, electrical and possibly also appropriate electronic steps must be taken to obtain a measurement sufficiently independent of the variations to which such an inductive coupling is subject. To achieve this, provision is made for locating part of the electronic circuit, supplied by the inductive coupling system, inside the seat assembly. In which case, this solution may be regarded as a simplified variation of the seat assembly in FIGS. 1-4.

Using a microprocessor on the seat assembly, more sophisticated measurements can be made, both in terms of measuring precision and, for example, in terms of determining the weights of individual components (shell and contents and/or component parts of the contents in the case of mixtures of components with different dielectric properties).

For example, the following may be performed:

multifrequency measurements (multifrequency technique);

vector measurements (determining capacitance and loss angle); and in the case of a transducer comprising more than two electrodes, a number of measurements between the various pairs of electrodes.

In the latter case (more than two electrodes), using methods similar to those used in "capacitive tomography", two important results can be obtained in terms of content measurement precision:

greater independence of the content weight measurement with respect to the spatial distribution of the product inside the bottom shell; and a certain amount of discrimination, in one measuring station, between the contributions of the content (product) and the container (shell).

Another advantage is that measuring can be performed when and/or in parts of the machine in which communication and power supply functions are inactive. This is particularly important in that, despite safe shielding of the components, for maximum precision, a delicate measurement such as a capacitive one should be performed in the absence of any other activity. Communication, in particular, is a fairly delicate operation if it involves radio fields and LED control as part of an optical transmission system.

Another advantage, as compared with known systems, is that the tare—comprising only the bottom shell as opposed to the whole capsule—is now lighter (roughly half the weight), so that any error in the tare measurement (particularly important on account of the high dielectric constant of the shell material with respect to that of the content) has a lesser effect on the net weight measurement.

Another advantage is that, in machines in which the capsule is filled in a number of successive steps, this technique provides for determining the product quantity deposited at each step.

The invention claimed is:

1. A machine for filling capsules, the machine comprising:
conveying means for conveying at least one seat assembly;
loading means for loading an empty bottom shell inside said at least one seat assembly;
evaluating means for evaluating the weight of the empty bottom shell housed in said at least one seat assembly;
filling means for filling said bottom shell with at least one product;
evaluating means for evaluating the weight of a full bottom shell;
a capacitive transducer which determines the difference between the dielectric properties of said empty bottom shell and said full bottom shell after each filling step, to determine the actual quantity of product deposited in said full bottom shell;
means for applying a top shell to said full bottom shell; and
means for expelling from the machine any full capsules whose quantity of product does not fall within an acceptable range;
wherein said at least one seat assembly also incorporates mechanical and/or electronic devices for transmitting energy and/or data; and
wherein said at least one seat assembly incorporates at least one microprocessor.

2. A machine as claimed in claim 1, characterized in that said at least one seat assembly also incorporates energy storage means.

3. A machine as claimed in claim 2, characterized in that said at least one seat assembly also comprises energy receiving means.

4. A machine as claimed in claim 3, characterized in that said energy receiving means receive energy with no contact with other means.

5. A machine as claimed in claim 3, characterized in that said energy receiving means receive energy by contact with other means.

6. A machine as claimed in claim 1, characterized in that said exchanged data is optoelectronic data.

7. A machine as claimed in claim 1, characterized in that each seat assembly is assigned an address memorized permanently in a fixed on-machine electronic device.

* * * * *